US009100853B2

(12) United States Patent
Garcia Martin et al.

(10) Patent No.: US 9,100,853 B2
(45) Date of Patent: Aug. 4, 2015

(54) POLICY DECISIONS FOR DATA COMMUNICATION IN CONSTRAINED RESOURCE NETWORKS

(75) Inventors: Miguel Angel Garcia Martin, Pozuelo de Alarcon Madrid (ES); Pablo Martinez De La Cruz, Madrid (ES)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 127 days.

(21) Appl. No.: 13/701,387

(22) PCT Filed: Oct. 28, 2010

(86) PCT No.: PCT/EP2010/066337
§ 371 (c)(1),
(2), (4) Date: Nov. 30, 2012

(87) PCT Pub. No.: WO2011/150986
PCT Pub. Date: Dec. 8, 2011

(65) Prior Publication Data
US 2013/0142042 A1    Jun. 6, 2013

Related U.S. Application Data

(60) Provisional application No. 61/350,075, filed on Jun. 1, 2010.

(51) Int. Cl.
*H04W 28/02* (2009.01)
*H04L 12/54* (2013.01)
(Continued)

(52) U.S. Cl.
CPC ....... *H04W 28/0268* (2013.01); *H04L 12/5692* (2013.01); *H04L 12/5695* (2013.01); *H04W 48/18* (2013.01); *H04W 48/08* (2013.01)

(58) Field of Classification Search
CPC ...... H04W 88/06; H04W 48/16; H04W 48/18
IPC ................... H04W 36/22, 48/18, 88/06, 48/16, H04W 84/12, 36/14, 28/08
See application file for complete search history.

(56) References Cited

U.S. PATENT DOCUMENTS

2010/0003980 A1    1/2010    Rune et al.
2011/0044253 A1*   2/2011    Zisimopoulos ............... 370/328
(Continued)

FOREIGN PATENT DOCUMENTS

WO    2009095336 A1    8/2009
WO    2009103678 A1    8/2009
(Continued)

OTHER PUBLICATIONS

First Office Action dated Mar. 23, 2015, issued in Chinese Patent Application No. 201080067159.5, 16 pages.

*Primary Examiner* — Fan Ng
(74) *Attorney, Agent, or Firm* — Rothwell, Figg, Ernst & Manbeck, P.C.

(57) ABSTRACT

A method comprising receiving a signal indicating that a first access network is unable to provide a desired quality level for data communication with the terminal; determining, in response to receiving a signal indicating that the first access network is unable to provide the desired quality level of data communication with the terminal, at least one further access network for providing a data flow of the data communication with the terminal; generating a set of policies for the data communication, the set comprising a plurality of policies wherein each policy specifies one or more access networks for one or more data flows of the data communication, and at least one policy specifies the at least one further access network for providing one or more data flows to the terminal; and providing the generated set of policies to the terminal.

29 Claims, 13 Drawing Sheets

(51) Int. Cl.
*H04W 48/18* (2009.01)
*H04W 48/08* (2009.01)

(56) References Cited

U.S. PATENT DOCUMENTS

2011/0072101 A1* 3/2011 Forssell et al. ................. 709/206
2011/0110300 A1* 5/2011 Sachs et al. ................... 370/328
2011/0264780 A1* 10/2011 Reunamaki et al. .......... 709/223
2013/0028193 A1* 1/2013 Rommer et al. ............... 370/328
2013/0034019 A1* 2/2013 Mustajarvi .................... 370/254

FOREIGN PATENT DOCUMENTS

WO 2009146864 A1 12/2009
WO 2010037422 A1 4/2010

* cited by examiner

POLICY DECISIONS FOR DATA COMMUNICATION IN CONSTRAINED RESOURCE NETWORKS

CROSS REFERENCE TO RELATED APPLICATION(S)

This application is a 35 U.S.C. §371 National Phase Entry Application from PCT/EP2010/066337, filed Oct. 28, 2010, designating the United States, and also claims the benefit of U.S. Provisional Application No. 61/350,075, filed Jun. 1, 2010. The disclosures of both applications are incorporated herein in their entirety by reference.

TECHNICAL FIELD

The present invention relates to the field of data communication, and more particularly to the determination of policies for providing data flows to a terminal so that a desired quality level of data communication with the terminal is achieved.

The present invention is particularly applicable to wireless networks. However, it is also applicable to other types of networks as well, such as wired networks.

Throughout the present document the term User Equipment (UE) is used. The term UE refers to any type of terminal, such as a fixed computer, mobile telephone, personal digital assistant (PDA), etc., and the terms UE and terminal are interchangeable.

BACKGROUND

A brief overview of technologies in known wireless networks is provided below.

Known wireless networks may comprise an Access Network Discovery and Selection Function, ANDSF, which is described for example in Chapter 4.8 of 3GPP specification 3GPP TS 23.402 v9.4.0 (March 2010) and 3GPP TS 24.302.

The packet core network and system referred to therein (Evolved Packet Core Network, EPC; Evolved 3GPP PS Domain, EPS) allows a UE to be provided, via the ANDSF, with policies for selecting access networks through which to connect to the packet core network (EPC).

The information provided by the ANDSF allows the UE to scan for access networks and to decide which access network to select among a plurality of access networks, based on data and policies.

Detailed background information of the current state of the art with respect to the ANDSF, and its interaction with UE(s), is provided below.

The ANDSF is a network element that contains data management and control functionality necessary to provide network discovery and selection assistance data in accordance with the operator(s) policy.

The introduction of an ANDSF does not impact on the attach procedures for any of the access operations. In particular, it does not interfere with the existing 3GPP PLMN selection mechanisms used for the 3GPP Access Technologies.

ANDSF defines a simple client-server architecture with single Access Network Info Request and Response messages. UEs may contact the ANDSF server by sending an Access Network Info Request message to it. The ANDSF server responds to the UE by sending an Access Network Info Response message.

In Access Network Info Response messages, the ANDSF provides two types of information: an inter-system mobility policy and access network discovery information.

With an inter-system mobility policy, an operator, or any other organization maintaining an ANDSF server, can affect which networks UEs are using.

For example, an inter-system mobility policy may contain a prioritized network list that advises the UE about a priority order in which it can consider access networks during the access network selection process. The inter-system mobility policies received from the ANDSF take precedence over those statically provisioned in the UE.

The UE can be configured in automatic or manual mode. In automatic mode, the UE may, at its discretion, accept policies and execute changes of access networks according to the received policies. In manual mode, the consent of the user is required prior to accepting a policy and executing it.

In the above known system, policies sent by the ANDSF are merely advice for selecting by the UE an access network, for example in case of roaming or handover.

Access network discovery information is intended to help the UE to discover networks in its neighborhood. For example, the access network discovery information may contain information on the network type, network ID, used radio frequency and channel. With this information, the UE may perform a network scan (i.e. discovery) more efficiently, since it does not need to go through all the possible access network technologies and frequency bands. By nature, the access network discovery information may be tied to a specific location and is also more short-lived than network selection information.

The ANDSF implements the S14 interface towards the User Equipment (UE). The interface is used to provide information on access networks available in the vicinity of the UE and information on operator's preference on these access networks. The S14 interface is implemented with OMA Device Management V1.2, OMA-ERELD-DM-V1_2_1, WAP Push OMA Push Architecture V2.3, OMA-AD-Push-V2_3-20091013-C, and a security mechanism that includes OMA DM bootstrap, secure HTTPS, IETF RFC 2616: Hypertext Transfer Protocol—HTTP/1.1, or GAA bootstrap, 3GPP TS 33.919: Generic Authentication Architecture (GAA); System description.

The information provided by the ANDSF is structured in a so-called OMA DM Managed Object, MO, according to what is specified in 3GPP TS 24.312. This will be referred to herein as an Access Network Discovery and Selection Function (ANDSF) Management Object (MO).

The UE and ANDSF S14 interface supports both a pull and a push mode. In pull mode the UE initiates the communication to retrieve the data. In push mode the ANDSF initiates the communication to send data to the UE.

In order for the UE to receive information from the ANDSF, the UE has to have IP connectivity and to have discovered the ANDSF. If the ANDSF needs to push data and the UE does not have IP connectivity, or has not discovered the ANDSF, the ANDSF can use WAP push to force the UE to trigger the process.

As shown in FIG. 1, the ANDSF can be located in a Home network, H-ANDSF 1002, or in a Visited network, V-ANDSF 1003.

For a UE 1001 that is roaming, it is possible that the UE 1001 acquires data from both the H-ANDSF 1002 and V-ANDSF 1003. In any case, the H-ANDSF 1002 and V-ANDSF 1003 do not have an interface between them. The interface specified between the UE 1001 and any of the H-ANDSF 1002 or V-ANDSF 1001 is the S14 interface.

The UE 1001 can also be statically provisioned with inter-system mobility policy and access network discovery information. In case the UE 1001 also acquires the same type of information from the network, the information acquired from the ANDSF has precedence over statically provisioned information in the UE 1001.

FIG. 2 shows a general information flow demonstrating signaling for both push and pull operation modes. The ANDSF 2002, at any time, can decide to push policy rules and discovery information to the UE 1001, using, for instance, WAP Push, as in step 201. The next steps are common for both push and pull modes. In step 202, the UE 1001 attaches its location information and requests the ANDSF 2002 to send the policy rules and discovery information. In step 203, the ANDSF 2002 filters the policy rules and discovery information according to the current location of the UE 1001 and then sends this filtered policy rules and discovery information to the UE 1001. Then the UE 1001 may need to switch new interfaces on or off, to try to attach to a new network (step 204), according to the information received from the ANDSF 2002. Eventually, the UE 1001 will attach to the new access network (step 205).

ANDSF 2002 is the node that manages two types of information: intersystem mobility policy and access network discovery information. Additionally, the UE 1001 is able to send to the ANDSF 2002 its UE current location.

An intersystem mobility policy is a set of operator-defined rules and preferences that affect the intersystem mobility decisions taken by the UE 1001. Therefore, intersystem mobility policies provide the UE 1001 with the means to prioritize the access network used by the UE 1001.

The access network discovery information merely provides the UE 1001 with additional information that helps the UE 1001 to gain access to the access network defined in the policy.

The ANDSF 2002 merely provisions the UE 1001 over the S14 interface with information policies for selecting access networks, wherein the final decision relies on information configured in the UE, and/or in decisions made by the UE's user.

The ANDSF MO contains three big chunks of data:
Inter-system Mobility Policy Rules: Composed of several conditions, including access network types (e.g. 3GPP, 3GPP2, WLAN, WiMAX), access network identifiers (e.g. PLMN, TAC. RAC, BSSID, etc), validity areas and time frames, among others, and a priority. The highest priority matched rule determines the access to be selected by the UE 1001.
Discovery Information: The discovery information data provides the UE 1001 with suitable data for helping in the discovery of access networks. This data contains the type of access network for which discovery information is provided (e.g., 3GPP, 3GPP2, WLAN, WiMAX); the access network area (e.g. PLMN, TAC, NAP-ID, BSSID, etc); and additional information on the specific access network.
UE location: The UE current location provides a placeholder for the UE 1001 to provide its current location to the ANDSF 2002, in terms of access network parameters or geographical location. This is used to filter the irrelevant data for the current location of the UE 1001.

The discussion of known access network technologies continues below where the provision of data communication to a terminal is generally considered.

The increasing demand for data communication, such as wireless IP connectivity, has reached a level where it is possible for demand to exceed the capacity of an access network. Some access network technologies, such as traditional GSM/GPRS, are, due their insufficient bandwidth, unable to provide an acceptable level of performance when the demand for data communication is high.

EDGE, W-CDMA, HSDPA and HSUPA technologies may provide an improved bandwidth, but they are also unable to cope with a high demand for data communication. LTE and its E-UTRAN with OFDMA and SC-FDMA technology may be able to provide a further increase in bandwidth. Other existing technologies, such as WLAN and WiMAX also try to meet the demand for high-bandwidth IP flows.

However, no known networks are currently capable of reliably meeting the largest demands for high bandwidth data communication. The high demand may be caused by, for example, the need to provide data connectivity to multiple users at the same time.

The above problem is expected to worsen as demand for data communication increases further.

In order to mitigate the above problem, operators have deployed multiple technologies for providing access to data networks (e.g., IP data networks such as the Internet) are there are known UEs capable of supporting multi-technology connectivity.

Although known UEs may implement multiple access network technologies and thereby provide connectivity through a variety of access networks, at the time of establishing a data communication, it is the user of the UE who selects an access network out of those available through the different technologies implemented in the UE device.

For example, the user may select a cellular access network (e.g. traditional GSM/GPRS, or LTE) or a WLAN access network when trying to connect to the Internet. If the selected access network suffers from a degree of congestion that prevents the service (e.g., connection to the Internet or establishment of a multimedia session) from being provided, the connection attempt to the IP data network fails and the user of the UE is not provided with the desired service.

In particular, when a UE device demands a certain Quality of Service when it is establishing data communication for a service, if the demand cannot be met, the UE device is required to limit its behavior to notify this (failure) event to the user. For example, an error message may be displayed to the user of the UE.

In short, regardless of the bandwidth that can be provided by an access network or multiple access network technologies, it is always possible that a UE will have its requested service rejected due to a lack of available resources in the access network that currently provides the UE with data connectivity (e.g. due to congested and/or unavailable nodes, the bandwidth required by the service cannot or should not be provided/guaranteed, etc).

However, the UE is not aware of this before requesting a service, and informing all of the UEs connected to an access network(s) with the network status of the network(s) is cumbersome, resource consuming, and may even be counterproductive (e.g. in the case that an access network is already congested, or close to congestion).

As a result, the user of a UE does not receive a requested service and has to manually select an alternative access network (e.g. using access network information provided by the UE).

Moreover, since the selected alternative access network may also be undergoing a congestion situation, the above problem of not receiving a requested service may be encountered by the user again.

SUMMARY

Embodiments of the invention alleviate the above-described problems and result in an improved level of data communication being provided to the UE.

More particularly, according to a first aspect of the invention there is provided a communications network node operable to determine a set of policies for a terminal that is connected to a first access network so as to provide a desired quality level of data communication with the terminal using a plurality of data flows, the network node comprising: a failure indication receiver operable to receive a signal indicating that the first access network is unable to provide a desired quality level for the data communication with the terminal; an access network determiner operable, in response to the failure indication receiver receiving a signal indicating that the first access network is unable to provide the desired quality level of data communication with the terminal, to determine at least one further access network suitable for providing a data flow of the data communication with the terminal; a policy generator operable to generate a set of policies for the data communication, the set comprising a plurality of policies wherein each policy specifies one or more access networks for one or more data flows of the data communication, and at least one policy specifies the at least one further access network determined by the access network determiner for providing one or more data flows to the terminal; and a policy provider operable to provide the generated set of policies to the terminal.

Further, according to a second aspect of the invention there is provided a method of determining a set of policies for a terminal that is connected to a first access network so as to provide a desired quality level of data communication with the terminal using a plurality of data flows, the method comprising: receiving a signal indicating that the first access network is unable to provide a desired quality level for the data communication with the terminal; determining, in response to receiving a signal indicating that the first access network is unable to provide the desired quality level of data communication with the terminal, at least one further access network suitable for providing a data flow of the data communication with the terminal; generating a set of policies for the data communication, the set comprising a plurality of policies wherein each policy specifies one or more access networks for one or more data flows of the data communication, and at least one policy specifies the at least one further access network for providing one or more data flows to the terminal; and providing the generated set of policies to the terminal.

According to a third aspect of the invention, there is provided a network node for use in a communications network, the network node comprising: a request receiver arranged to receive a request from a second network node requesting information on access networks available for connection to a user terminal that is currently connected to a first access network; an information determiner arranged to determine at least one further access network available for connection to the terminal; a response transmitter arranged to transmit to the second network node the information determined by the information determiner defining at least one further access network for connection to the terminal; wherein: the receiver is further arranged to receive a set of policies from the second network node for the terminal specifying at least one access network other than the first access network to be used by the terminal for data communication, the set comprising a plurality of policies wherein each policy specifies one or more access networks for one or more data flows of the data communication, and at least one policy specifies at least one further access network other than the first access network for providing one or more data flows to the terminal; and the transmitter is operable to transmit an instruction to the terminal to retrieve the set of policies.

Preferably, the network node of the third aspect is an Access Network Discovery and Selection Function, and the second network node is a Policy and Charging Rules Function.

Further, according to a fourth aspect of the invention, there is provided a method of operating a network node in a communications network, the method comprising: receiving a request from a second network node for information on access networks available for connection to a user terminal that is currently connected to a first access network; determining at least one further access network available for connection to the terminal; transmitting to the second network node the determined information defining at least one further access network for connection to the terminal; receiving a set of policies from the second network node for the terminal specifying at least one access network other than the first access network to be used by the terminal for data communication, the set comprising a plurality of policies wherein each policy specifies one or more access networks for one or more data flows of the data communication, and at least one policy specifies at least one further access network other than the first access network for providing one or more data flows to the terminal; and transmitting an instruction to the terminal to retrieve the set of policies.

Preferably, the network node in the fourth aspect is an Access Network Discovery and Selection Function, and the second network node is a Policy and Charging Rules Function.

According to a fifth aspect of the invention there is provided a terminal comprising: a data communication request transmitter operable to transmit a request for data communication comprising a plurality of data flows; a data communication response receiver operable to receive a response to the request comprising an instruction to retrieve a new set of policies for the data communication; a policy retriever operable, in response to the instruction to retrieve the new set of policies, to retrieve the new set of policies, the set comprising a plurality of policies wherein each policy specifies one or more access networks for one or more data flows of the data communication, and at least one policy specifies at least one further access network other than the access network to which the terminal is currently connected for providing one or more data flows to the terminal, and wherein at least one policy contains data flow information defining whether the policy applies only to a currently established data flow, a currently established data flow and a future data flow, or only to a future data flow; and a policy implementer operable to implement the new set of policies for the data flows in accordance with the data flow information.

Preferably the data flow information in the fifth aspect comprises a flag in an Access Network Discovery and Selection Function, ANDSF, Management Object, and the policy implementer is operable to read the flag to determine the data flow information.

Further, according to a sixth aspect of the invention there is provided method of operating a terminal, the method comprising: transmitting a request for data communication comprising a plurality of data flows; receiving a response to the request comprising an instruction to retrieve a new set of policies for the data communication; retrieving, in response to the instruction to retrieve the new set of policies, the new set of policies, the set comprising a plurality of policies wherein each policy specifies one or more access networks for one or more data flows of the data communication, and at least one policy specifies at least one further access network other than the access network to which the terminal is currently connected for providing one or more data flows to the terminal, and wherein at least one policy contains data flow information defining whether the policy applies only to a currently established data flow, a currently established data flow and a future data flow, or only to a future data flow; and implementing the new set of policies for the data flows in accordance with the data flow information.

Preferably the data flow information in the sixth aspect comprises a flag in an Access Network Discovery and Selection Function, ANDSF, Management Object, and the process of implementing reads the flag to determine the data flow information.

The present invention also provides a computer program product, such as a storage medium or a signal, carrying computer program instructions to program a programmable processing apparatus to perform the method of the invention.

LIST OF FIGURES

DESCRIPTION OF EMBODIMENTS

Figure 1:
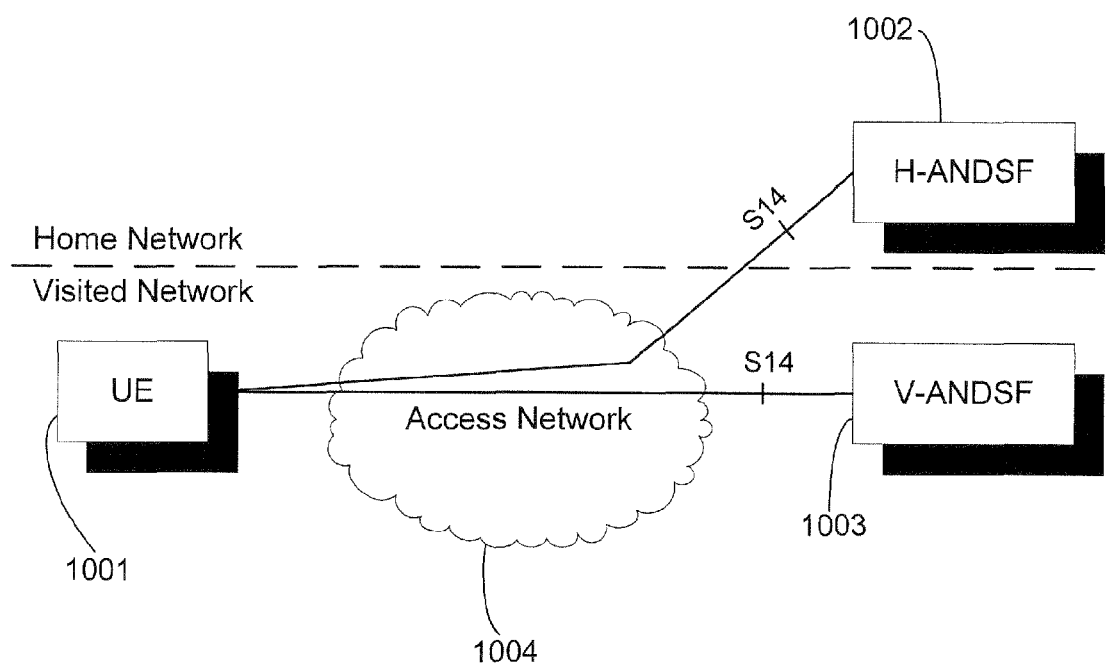
FIG. 1 shows a known network architecture in which User Equipment, UE, is connected to a Home Access Network Discovery and Selection Function, H-ANDSF, and/or a Visited Access Network Discovery and Selection Function, V-ANDSF, via an access network.
Figure 2:
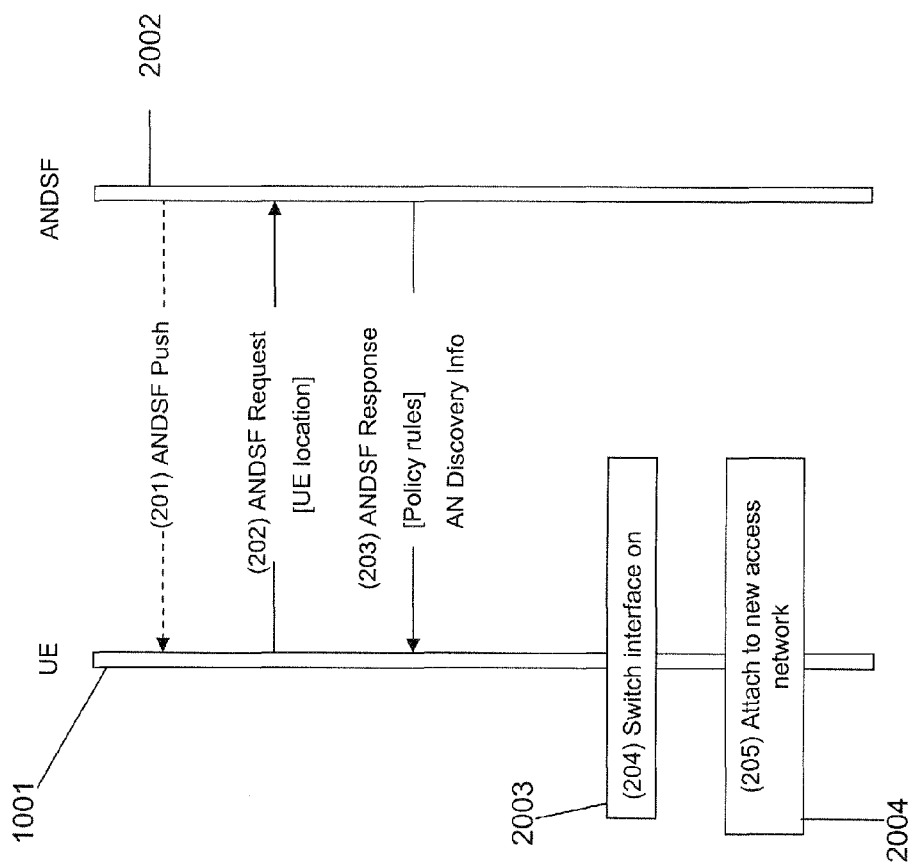
FIG. 2 shows communications between a UE and an Access Network Discovery and Selection Function, ANDSF, according to known procedures.

Embodiments of the invention are described below.

Reference is made to a particular embodiment wherein a UE attempts to establish data communication.

In the below described embodiment, the UE is a mobile terminal and the data communication is with a plurality of IP data flows. Embodiments are particularly effective in such applications.

However, it will be appreciated that embodiments are in no way restricted to applications with mobile terminals and IP communication, and that embodiments may alternatively use other types of terminal, such as a fixed terminal, and other types of data communication.

Furthermore, in the present embodiment, the IP data communication is a multimedia session consisting of SIP signaling, audio, and video data flows that are provided through an IP Multimedia Subsystem, IMS.

However, it will be appreciated that other applications may also be used such as mobile TV applications, web browsing, online content download, streaming, etc.

By way of overview, in the embodiment described below, a Policy and Charging Rules Function, PCRF, detects that a service requested by a UE, connected to a first access network has failed (e.g. because it can not—or should not—be provided due to a congestion condition in the first access network). Subsequently, the PCRF obtains availability information of a second access network and orders, through an ANDSF, the UE to establish a connection with the second access network with regard to one or more of the data (IP) flows relating to the service which has failed. The order sent to the UE can also establish its applicability with regard to data flows relating to further services of said UE during a certain time period, so that they are established with the second access network.

Since the affected data flows to be switched/established towards the second access network (e.g. not congested network) can be indicated to the UE, the embodiment thus allows providing service continuity when congestions occur in a certain network, and e.g. data flows conveying media related to said service can not be provided (and/or its QoS guaranteed), whilst maintaining service signalling communication between the UE and the server providing the final service (or intervening on its provisioning).

The embodiment enhances the existing Policy and Charging Rules Function (PCRF) and the existing Access Network Discovery and Selection Function (ANDSF) so that a fraction or all the IP data flows related to a first access network (eventually congested, or closed to congestion) are diverted or offloaded to an alternative second access network (e.g. where resources are available).

Upon a request from a PCRF, an ANDSF Management Object is sent from the network to the UE over the S14 interface in order to indicate network policies with respect to the availability and discovery information of access networks. The embodiment introduces enhancements within the ANDSF Management Object, by allowing it to indicate the time of applicability of a new policy (at a present or future time), and to indicate which IP flows are affected by the each policy out of a plurality of IP flows being established at that time by the UE.

Figure 3:
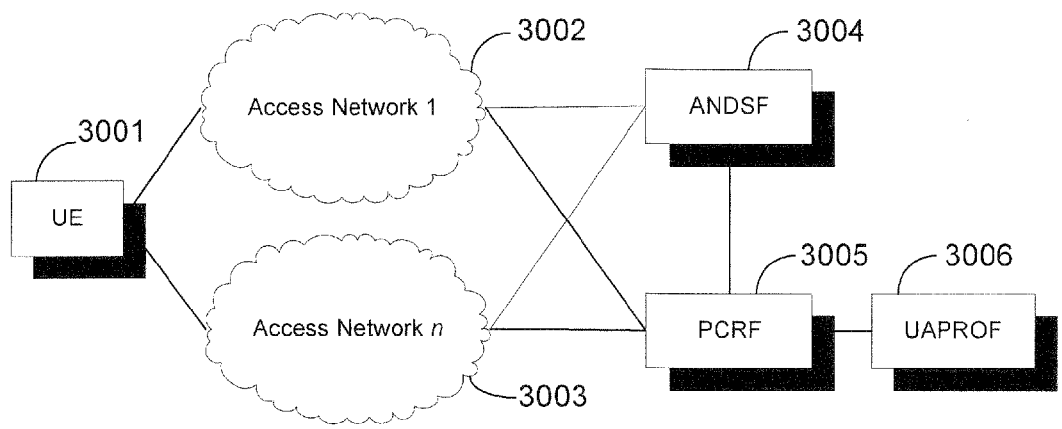
FIG. 3 shows a network architecture with a communication path between an ANDSF and Policy and Charging Rules Function, PCRF, according to an embodiment.

FIG. 3 provides a schematic view of the present embodiment showing the relative arrangement of the UE 3001, multiple access networks 3002, 3003, Policy and Charging Rules Function (PCRF) 3005, Access Network Discovery and Selection Function (ANDSF) 3004 and User Agent Profile (UAPROF) 3006. Details of a node implementing a conventional PCRF are provided by 3GPP specification TS 23.203, which specifies a Policy and Charging Control architecture, PCC, wherein a PCRF is a node performing policy control and charging decisions on data flows related to one or more UEs. In the present embodiment, the PCRF 3005 is provided with new and enhanced functionality, as described in detail below.

The multiple access networks 3002, 3003 are connected to the same ANDSF 3004. Similarly, the multiple access networks 3002, 3003 are also connected to the same PCRF 3005. Although a direct connection between the multiple access networks and the ANDSF 3004 and PCRF 3005 is shown, it will be appreciated that indirect connections would also be possible with other nodes connected between the ANDSF 3004 and/or PCRF 3005 and the multiple access networks.

The UAPROF 3006 is preferably connected to the PCRF 3005. Although a direct connection between UAPROF and 3006 the PCRF 3005 is shown in FIG. 3, an indirect connection may alternatively be provided, wherein the communication between the PCRF 3005 and the UAPROF 3006 is via other network nodes.

The UAPROF comprises a database storing information on the UEs (which information may include, amongst other things, information about the type of access networks a certain UE can access to). The interface between a PCRF and a UAPROF provides the PCRF with information about the capabilities of a UE (e.g. access network capabilities), thereby allowing the PCRF to generate policies for a data communication of a UE upon reception of a failure indication, wherein the determined policies can be adapted by the PCRF with regard to the obtained UE capabilities (e.g. policies for a UE with regard to one or more access networks can take into account the UE's access network capabilities).

The ANDSF 3004 and PCRF 3005 are connected to each other. Although a direct connection between the H-PCRF 3005 and the H-ANDSF 3004 is shown in FIG. 3, an indirect connection may alternatively be provided, wherein the communication between the PCRF 3005 and the ANDSF 3004 is via other network nodes.

In the present embodiment, when a request for data communication by the UE 3001 is made, the UE 3001 is connected to a first access network 3002 and the UE 3001 sends a request for IP data communication via the first access network 3002.

Figure 4:
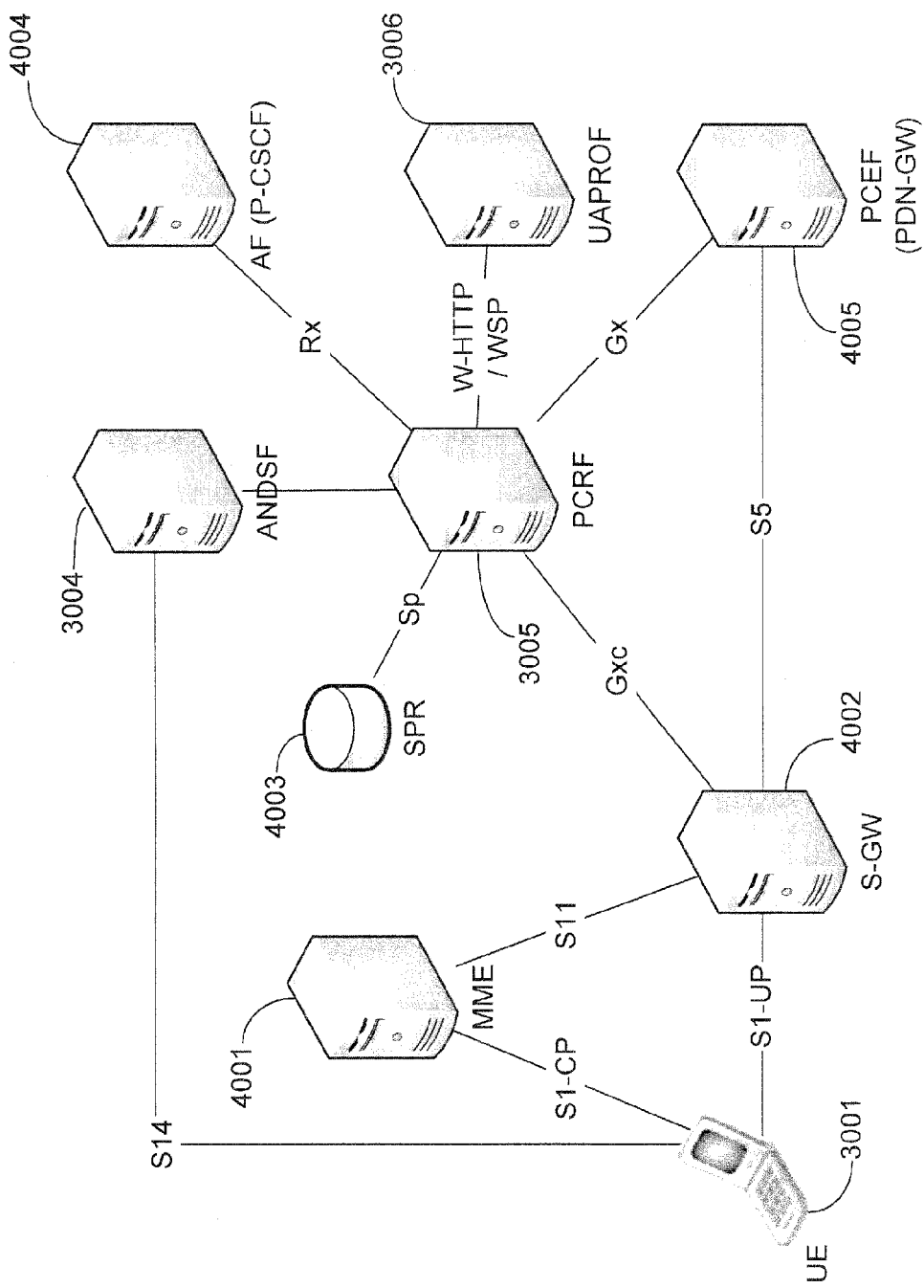
FIG. 4 shows a detailed network architecture with a communication path between an ANDSF and PCRF according to an embodiment.

FIG. 4 shows in more detail the network architecture of the present embodiment.

The network includes the UE 3001, Mobility Management Entity (MME) 4001, Signaling Gateway (S-GW) 4002, PCRF 3005, Subscriber Profile Repository (SPR) 4003, UAPROF 3006, Policy and Charging Enforcement Function (PCEF, PDN-GW) 4005, Proxy Call Session Control Function (P-CSCF) 4004 and ANDSF 3004. The radio elements of the access networks (e.g. access network bases stations) are not shown in order to simplify the figure.

A Proxy CSCF 4004, P-CSCF, of the IMS takes the role of an Application Function, AF, that interacts with the PCRF 3005 of the policy architecture. It will be appreciated that although the PCEF is shown to be a PDN-GW, this may also be referred to as a P-GW.

Figure 5:
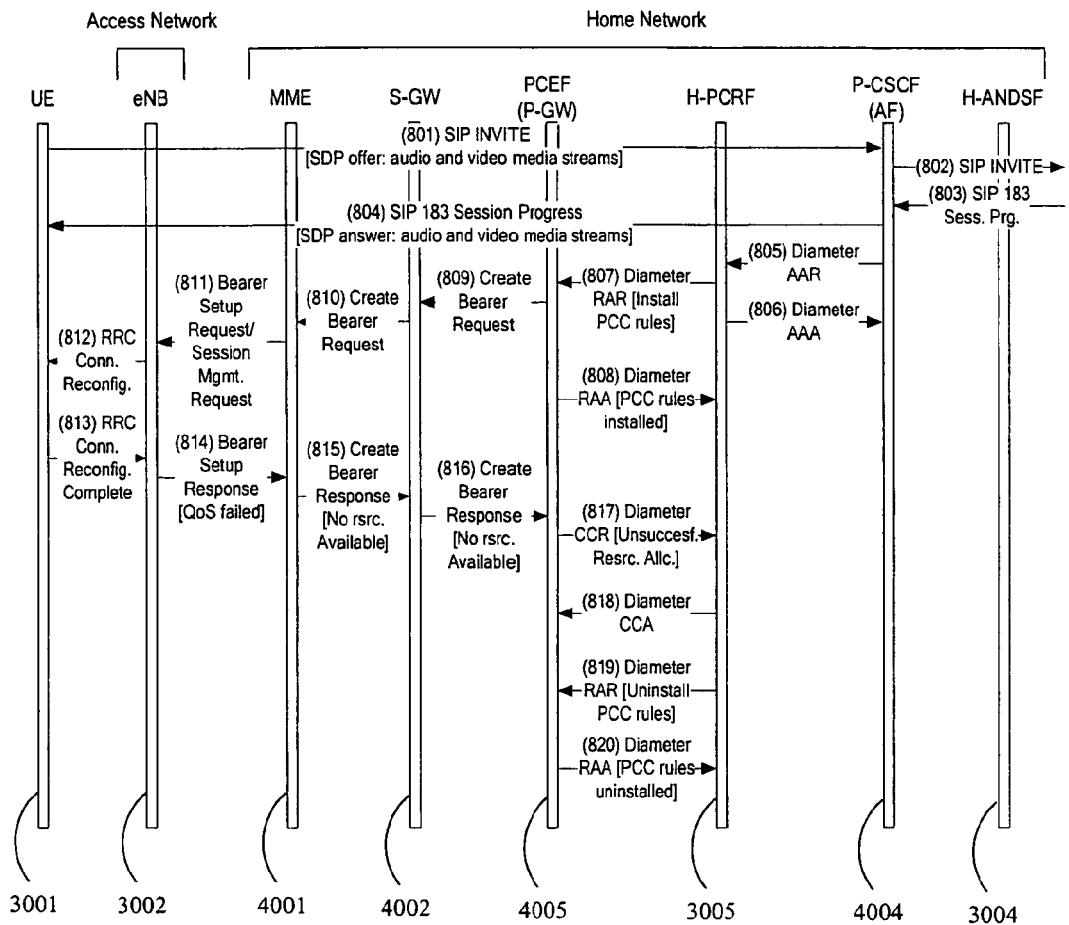
FIG. 5 shows communications between network nodes according to an embodiment.

The network architecture shown in FIG. 4 improves upon 3GPP Technical Specification 23.203 version 10.0.0, FIG. 5.1.1, and the embodiment of the invention may operate in addition to, or in conjunction with, the disclosed architecture therein.

The processing operation performed by the nodes in the present embodiment are described below with reference to FIGS. 5 and 6, which show communications between the nodes within the network.

Referring to FIG. 5, the current access network, which corresponds to the first access network 3002 shown in FIG. 3, is provided by the node eNB 3002.

The nodes MME 4001, S-GW 4002, PCEF 4005, H-PCRF 3005, P-CSCF 4004 and H-ANDSF 3004, which correspond to nodes shown in FIG. 4, are all provided in a Home network.

The H-PCRF 3005 is a PCRF 3005 provided in the Home network and the H-ANDSF 3004 is an ANDSF 3004 provided in the Home network.

In this embodiment, the network also comprises a UAPROF 3006 (not shown in FIGS. 5 and 6) that can communicate with the H-PCRF 3005 as described above with reference to FIG. 3.

The communication between the UE 3001 and network nodes is described below.

Before a request for a multimedia session is made, the UE 3001 is already registered to the IMS network using the first access network 3002. The first access network 3002 may be, for example, an LTE, and all of the IMS-related signaling uses this first access network 3002.

The UE 3001 tries to establish the multimedia session by sending 801 a SIP INVITE request that describes an audio and a video media stream to be setup. The INVITE request is received by the P-CSCF 4004 serving the UE 3001, which eventually contacts 805 the PCRF 3005 in the Home network in order to authorize the establishing of the multimedia session. The H-PCRF 3005 authorizes the session and proceeds to install 807 the PCC rules.

However, a failure happens 814 in the access network. The failure to establish the requested data flows may, for example, be caused by congestion due to a larger demand for data communication than can be provided by the access network.

The H-PCRF 3005 is duly informed by signal 817 that the data flows could not be established.

Figure 6:
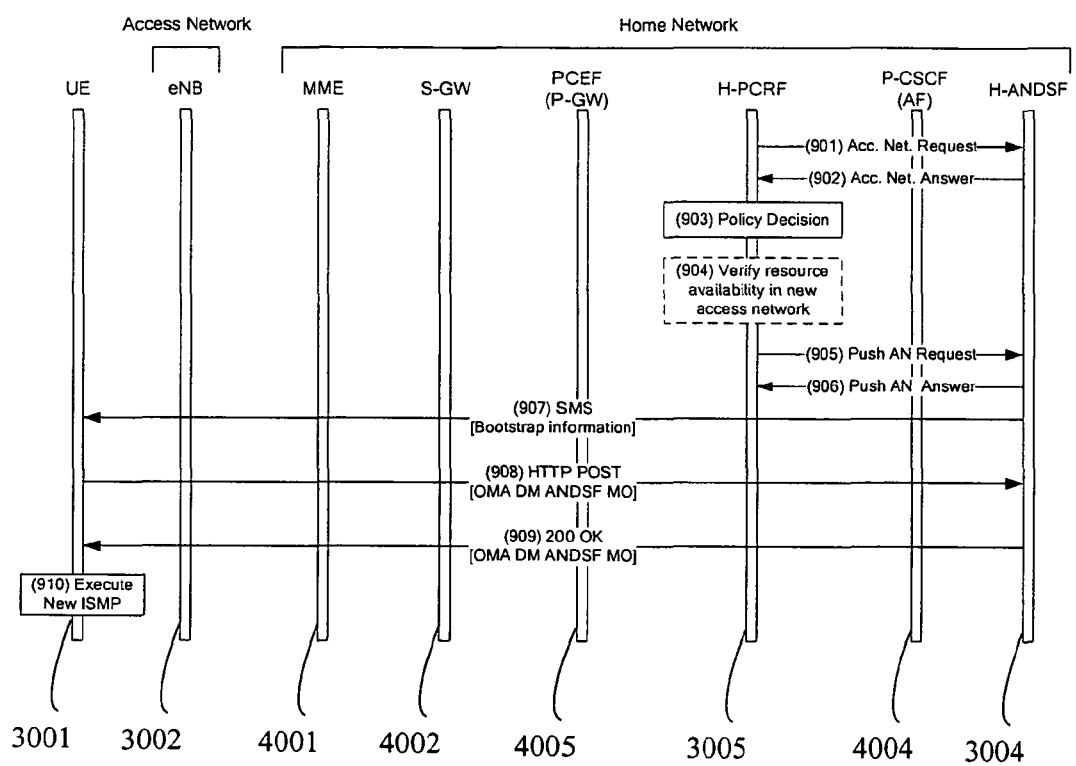
FIG. 6 shows communications between network nodes according to an embodiment.

The description of the embodiment continues with reference to FIG. 6.

Upon reception of a failure indication, the H-PCRF 3005 requests 901 the H-ANDSF 3004 to provide information on further access networks that are available in the surroundings of the UE 3001.

Accordingly, the present embodiment provides a new network architecture in which communication between a PCRF 3005 and an ANDSF 3004 is possible. Such a communication link is not present in known network architectures.

In response to the request from the H-PCRF 3005, the H-ANDSF 3004 transmits 902 information on further access networks that are available in the surroundings of the UE 3001 to the H-PCRF 3005.

Preferably, the H-PCRF 3005 also obtains information on the capabilities of the UE 3001 from the UAPROF 3006 (which comprises a database storing information on the UEs).

After receiving information on one or more further access networks in the surroundings of the UE 3001 and, preferably, also information on access network technologies implemented in the UE 3001, the H-PCRF 3005 creates 903 a set of policies for the UE 3001 comprising, for example, a prioritized list of one or more further access networks.

If both information that an access network(s) in the surroundings of the UE 3001 is available and information on the capabilities of the UE 3001 to operate with the access network(s) is available, then the prioritized list will be determined using both types of information and comprise access networks that are both available and suitable for operating with the UE 3001.

Preferably, the H-PCRF 3005 also verifies 904 the availability of the resources for establishing the desired multimedia call in the newly selected access networks. This verification may be preformed a-priori.

Advantageously, this provides the H-PCRF 3005 with more information on the capability of each access network and allows an improved determination of suitable further access networks to connect to.

However, although verifying the availability of the resources by the H-PCRF 3005 is preferable, it is not essential for advantageously determining a suitable further access network(s) to connect to according to embodiments of the invention.

The resources of the access networks may be verified for all of the data flows of the requested multimedia session (i.e.

signaling, audio and video data flows in the present embodiment) or for just some of the data flows (e.g. only the video data flow).

The H-PCRF 3005 is able to manage each data flow of the data communication separately and is not restricted to managing all of the data flows of the data communication together. This allows the H-PCRF 3005 to divert some, but not necessarily all, of the data flows to an alternative access network(s).

For example, the H-PCRF 3005 may determine that just the video data flow is to be provided by a further access network and that the other data flows are provided by the current access network (or vice versa).

As another example, the H-PCRF 3005 may determine a first further access network for providing at least one of the data flows, a second further access network for providing at least one of the data flows (different from the data flow(s) provided by the first further access network) and for no data flows to be provided by the current access network.

Advantageously, by managing one or more data flows of the requested data communication separately, the H-PCRF 3005 can determine the most appropriate way of providing each data flow using the available resources. Thus, the H-PCRF 3005 is not restricted to determining a single further access network suitable for providing all of the data flows.

Furthermore, the H-PCRF 3005 is not restricted to managing each data flow separately or even a single data flow separately.

For example, the H-PCRF 3005 could realize the above-described advantages by determining for two data flows (of a data communication comprising four data flows) to be provided by a first further access network and for the other two data flows to be provided by a second further access network.

Referring again to FIG. 6, if the H-PCRF 3005 determines that it is appropriate to provide one or more of the data flows comprised by the multimedia call in at least one further access network, the H-PCRF 3005 provides the generated policies to the UE 3001. In this embodiment, the H-PCRF provides the set of policies to the UE via the H-ANDSF 3004. More particularly the H-PCRF 3005 contacts 905 the H-ANDSF 3004 and sends it the generated policies defining (i) one or more further access networks that the UE 3001 should use (preferably in the form of a prioritized list), (ii) the IP flows to which the further access networks apply and (iii) timing information defining when the UE 3001 should access each further access network.

The timing information may provide an absolute time at which an access should be made but, preferably, the timing information is expressed as a delta time (i.e. difference in time) from the current time.

The H-ANDSF 3004 receives 905 the set of policies from the H-PCRF 3005.

The H-ANDSF 3004 then instructs the UE 3001 to retrieve a new set of policies. This can be done by the H-ANDSF 3004 by sending 907 an SMS to the UE 3001 or via other regular procedure.

The message sent to the UE 3001 by the H-ANDSF 3004 contains address information defining where the UE 3001 can retrieve the new set of policies. The message may be an order for the immediate attention of the UE 3001.

Upon receiving the message from the H-ANDSF 3004, the UE 3001 invokes the address included therein and sends 908 a request to the address, again using regular procedures. The address resolves to the H-ANDSF 3004, which, upon receiving the response from the UE 3001, sends 909 to the UE 3001 a policy message, which in this embodiment comprises an enhanced ANDSF 3004 Management Object that is not present in known systems.

A description of what the policy message comprises and the advantages of each feature is provided below:

A plurality of policies (i.e. set of policies), wherein each policy indicates a preferred list of one or more access networks to be used by the UE 3001. Each policy also indicates the one or more data flow(s) to which it applies.

For example, in the case of a multimedia session comprising audio and video, there are three IP flows: Signaling (e.g. SIP), audio (RTP), and video (RTP).

In the event that the H-PCRF 3005 has determined that each data flow should be established through a different access network, the ANDSF 3004 Management Object would comprise three policies, with each policy applicable to a single and different IP flow.

On the other hand, if the H-PCRF 3005 has determined that signaling should use one access network and media another one, the ANDSF 3004 Management Object would comprise only two IP policies, one applicable to the signaling IP flow, the other applicable to the audio and video IP flows.

The determination of separate policies for one or more data flow of a data communication advantageously allows the separate handling of the data flows by different access networks.

For each policy, there is provided information indicating the data flows that the policy applies to. This information may take the form, for example, of one or more flags.

For example, the flag(s) may be used to indicate whether the policy applies to currently established data flows only, currently established data flows and future data flows to be established, or only to future flows.

The time of applicability, preferably expressed as relative time, which orders the UE 3001 when it should start executing the newly received policy for each of the concerned IP flows, and/or during what period.

Figure 7:
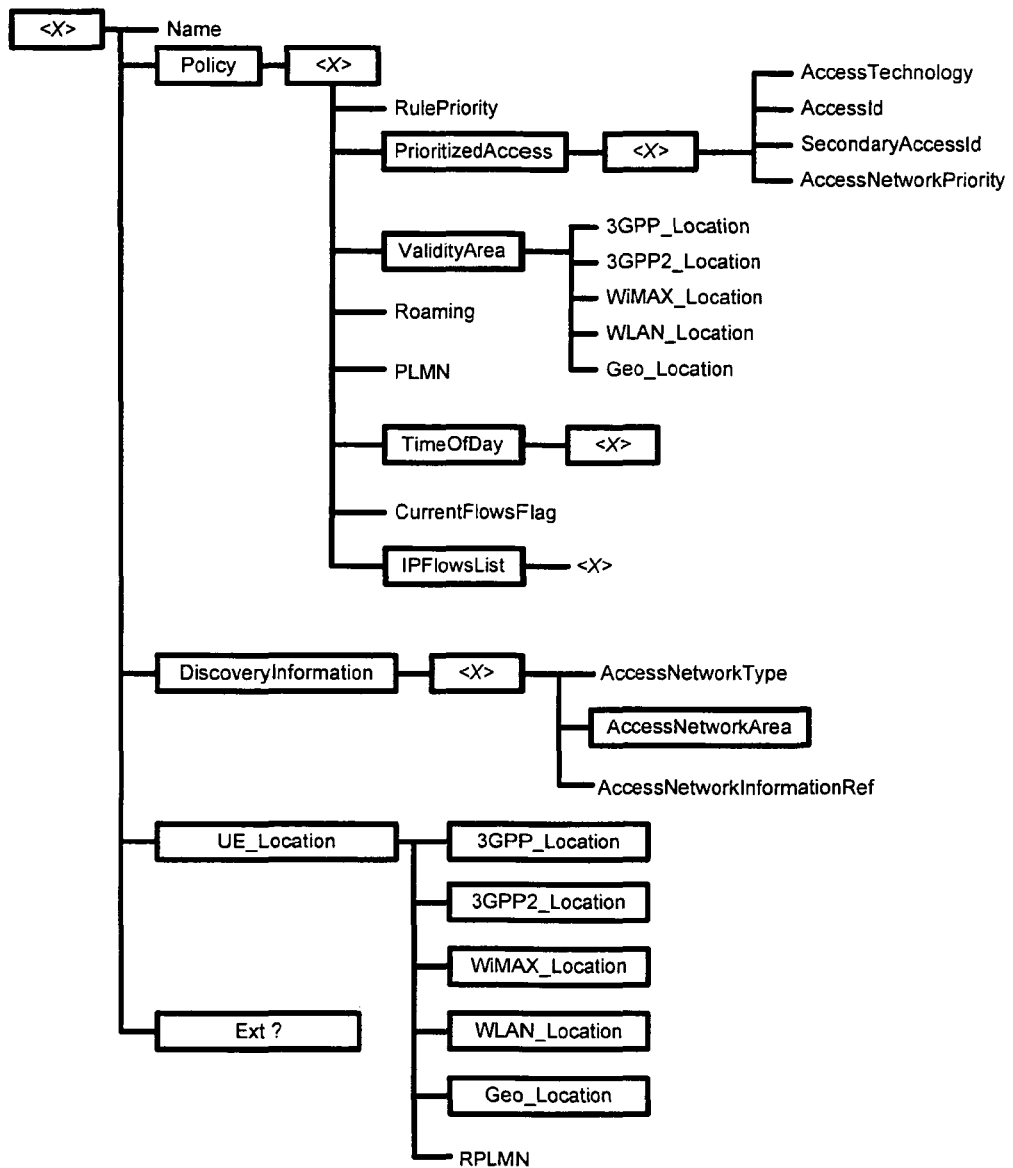
FIG. 7 shows an enhanced ANDSF Management Object according to an embodiment.

As noted above, the policy message in the present embodiment comprises an enhanced ANDSF Management Object. An example of a suitable enhanced ANDSF 3004 Management Object is shown in FIG. 7.

The enhancement to the ANDSF 3004 Management Object comprises the addition of two new information elements to the Object:

<X>/Policy/<X>/CurrentFlowsFlag:
This flag indicates whether the policy applies to any of: currently established data flows only, currently established data flows and future data flows to be established, or only to future flows.

<X>/Policy/<X>/IPFlowList:
This is a list of one or more existing data flows to which the policy applies.

Upon reception 909 of the policy message containing an enhanced ANDSF Management Object, the UE 3001 proceeds 910 with the execution of the new policies. This involves the processes of:

Waiting until the instructed time of when to execute a policy.

Switching to the new interfaces of a further access network(s) indicated in the set of policies.

Attaching or connecting to the further access network(s) indicated in the set of policies.

Establishing data flows through the further access network(s).

Preferably, detaching from the first access network 3002 if the first access network is no longer in use.

Preferably, switching off the interface in the UE 3001 to the first access network, if the first access network 3002 is no longer in use.

It will therefore be understood that the embodiment allows control and distribution of data flows through all available access networks, avoiding a situation in which a single access network becomes overloaded, while other access networks are under-utilized.

A description will now be given of the core features of the individual network nodes, and the core processing operations of the individual network nodes, according to embodiments.

Figure 8:
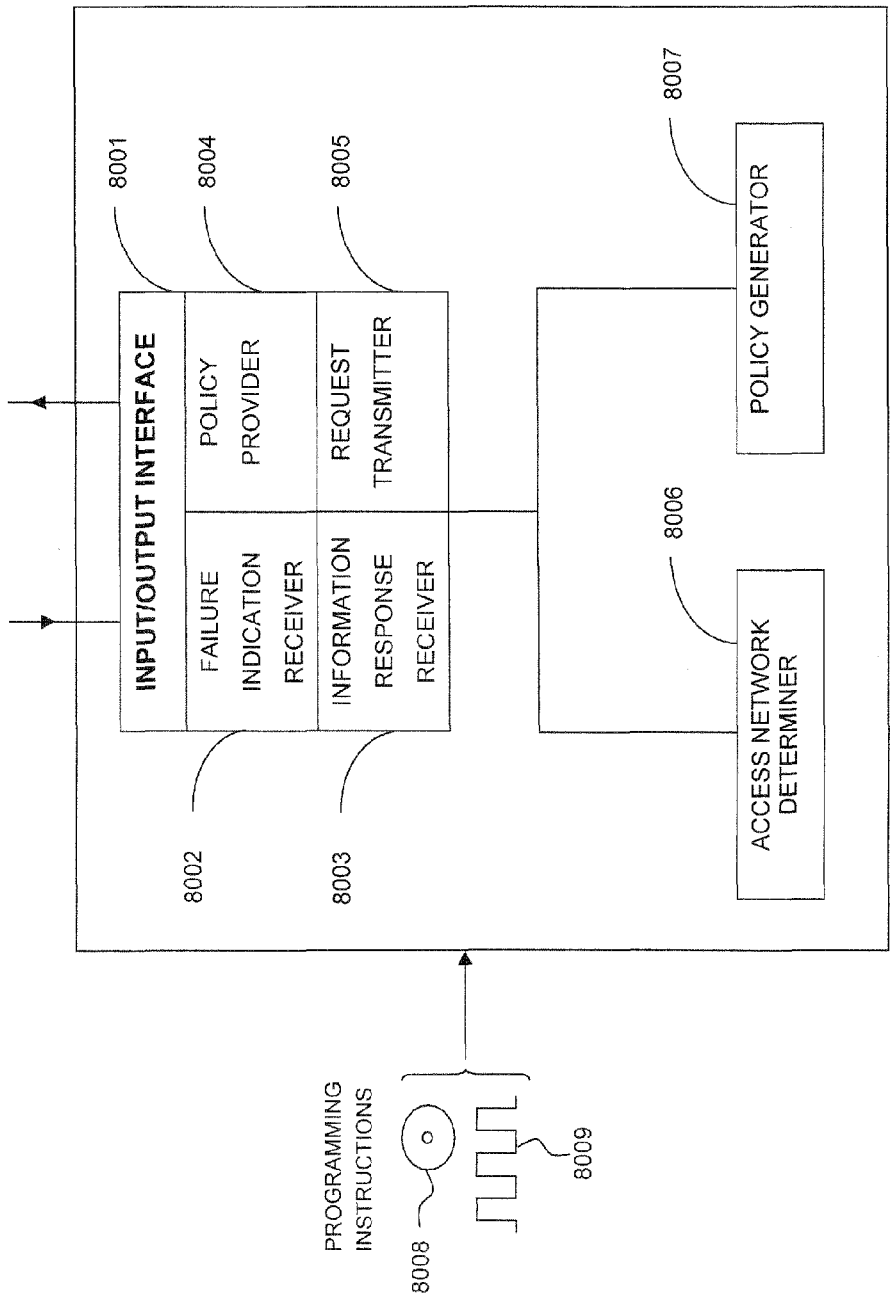
FIG. 8 shows components of a PCRF according to an embodiment.

FIG. 8 shows a block diagram of a PCRF 3005 for use in embodiments of the invention.

Referring to FIG. 8, the PCRF 3005 comprises an input/output interface 8001, an access network determiner 8006 and a policy generator 8007.

In the present embodiment, the PCRF 3005 comprises a programmable processing apparatus programmed to operate in accordance with programming instructions input, for example, as data stored on a data storage medium 8008 (such as an optical CD ROM, semiconductor ROM, magnetic recording medium, etc), and/or as a signal 8009 (for example an electrical or optical signal input to the programmable processing apparatus, for example from a remote database, by transmission over a communication network (not shown) such as the Internet or by transmission through the atmosphere), and/or entered by a user via a user input device such as a keyboard.

The input/output interface 8001 comprises a failure indication receiver 8002, an information response receiver 8003, a policy provider 8004 and a request transmitter 8005.

The above components of the PCRF 3005 are provided in addition to conventional components of a PCRF 3005. The interface components shown in FIG. 8 may be provided as part of the conventional PCRF 3005 interface.

Although shown as one block, the input/output interface 8001 may be provided by separate input and output interfaces. The input interface may be a single receiver that comprises both the failure indication receiver 8002 and the information response receiver 8003. Similarly, the output interface may be a single transmitter that comprises both the policy provider 8004 and the request transmitter 8005.

The failure indication receiver 8002 is arranged to receive the previously described signal indicating that an access network was unable to provide a requested data communication by the UE 3001. The failure indication receiver 8002 is further arranged to report the signal receipt to the request transmitter 8005.

The request transmitter 8005 is arranged to transmit the previously described requests to the ANDSF 3004 for information on access networks available for connection to the UE 3001.

The response receiver 8003 is arranged to receive the response form the ANDSF 3004 comprising information on one or more access networks available for connection to the UE 3001.

The information response is further arranged to transmit the information received from the ANDSF 3004 to the access network determiner 8006.

The access network determiner 8006 is arranged to use the information received from the information response receiver 8003 to determine at least one further access network for providing at least one data flow of the data communication to the UE 3001.

The access network determiner 8006 is further arranged to send to the policy generator 8007 the determined information on the further access network(s) for providing at least one data flow of the data communication with the UE 3001.

The policy generator 8007 is arranged to use the received information from the ANDSF 3004 to generate the previously described set of policies for the data communication. The policy generator 8007 is further arranged to send the generated set of policies to the policy provider 8004.

The policy provider 8004 is arranged to provide the generated set of policies to the UE 3001. In this embodiment the policy provider 8004 provides the set of policies via the ANDSF 3004. Accordingly, in this embodiment, the policy provider 8004 is arranged to transmit, via the transmitter 8005 of the input/output interface, the set of policies from the PCRF 3005 to the ANDSF 3004.

Figure 9:
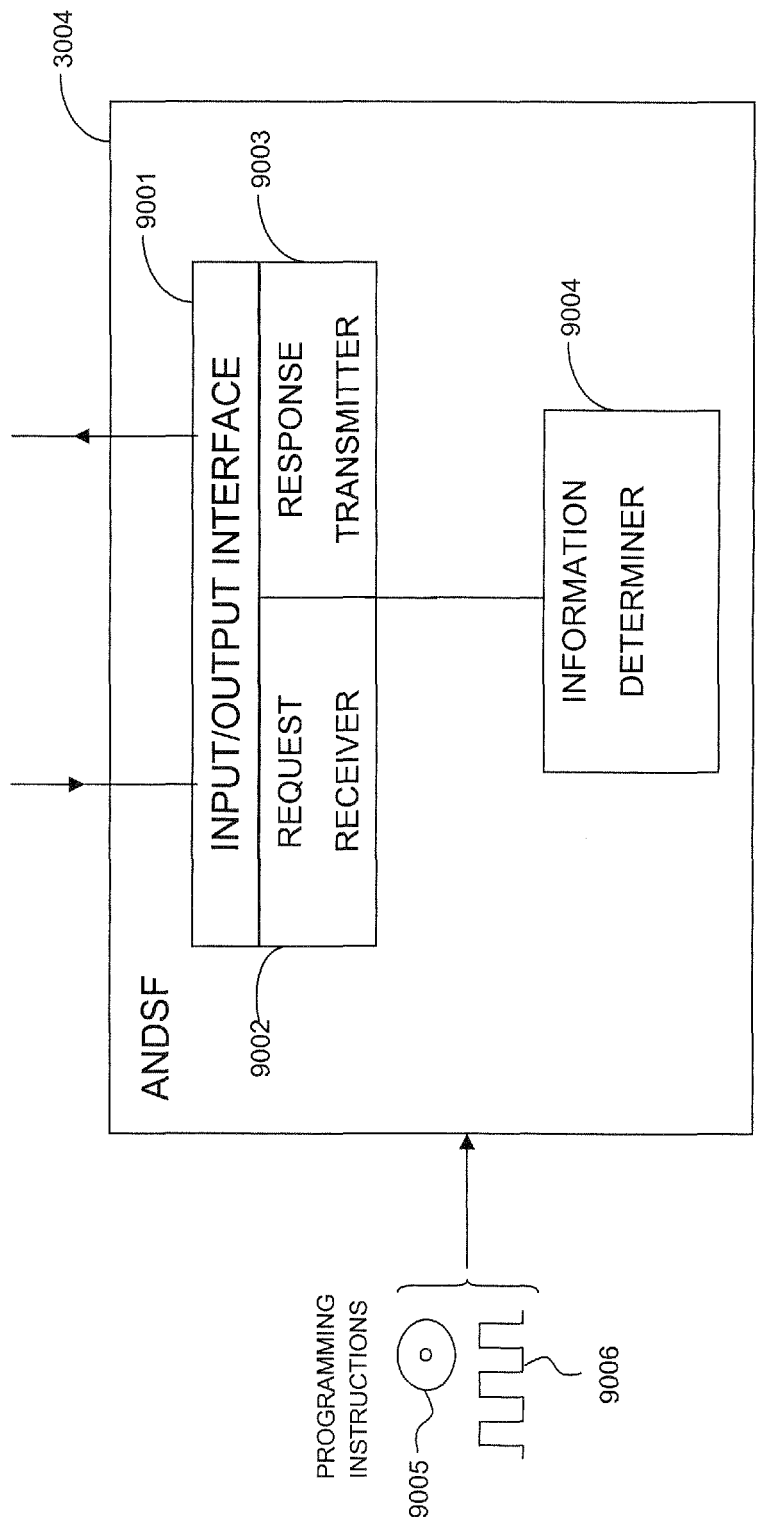
FIG. 9 shows components of an ANDSF according to an embodiment.

FIG. 9 shows a block diagram of an ANDSF 3004 for use in embodiments of the invention.

Referring to FIG. 9, the ANDSF 3004 comprises an input/output interface 9001 and an information determiner 9004, in addition to the conventional components of an ANDSF.

In the present embodiment, the ANDSF 3004 comprises a programmable processing apparatus programmed to operate in accordance with programming instructions input, for example, as data stored on a data storage medium 9005 (such as an optical CD ROM, semiconductor ROM, magnetic recording medium, etc), and/or as a signal 9006 (for example an electrical or optical signal input to the programmable processing apparatus, for example from a remote database, by transmission over a communication network (not shown) such as the Internet or by transmission through the atmosphere), and/or entered by a user via a user input device such as a keyboard.

The input/output interface 9001 comprises a request receiver 9002 and a response transmitter 9003.

The above interface components of the ANDSF 3004 may be provided as part of the conventional ANDSF 3004 interface.

Although shown as one block, the input/output interface 9001 may be provided by separate input and output interfaces.

The request receiver 9002 is arranged to receive the previously described request from the PCRF 3005 for information on access networks available for connection to a UE 3001 that is currently connected to a first access network 3002.

The request receiver 9002 is further arranged to send instructions to the information determiner 9004 in order to obtain the requested information.

The information determiner 9004 is arranged to determine at least one further access network available for connection to the UE 3001. The information determiner 9004 is further arranged to send the determined information to the response transmitter 9003.

The response transmitter 9003 is arranged transmit the information received from the information determiner 9004 to the PCRF 3005.

Accordingly, the ANDSF 3004 is able to provide another network node (for example the PCRF in the described embodiment) with information on access networks for supporting a UE 3001 in response to a request for such information.

The ANDSF 3004 is further arranged to pass on the previously described set of policies that are received from the PCRF 3005 to the UE 3001.

The same receiver may be used for receiving the requests from the PCRF 3005 and the set of policies from the PCRF 3005 or, in an alternative implementation, separate receivers could be used for receiving the request and the set of policies.

As described before, the received set of policies for the UE 3001 specify at least one access network other than the first access network 3002 to be used by the UE 3001 for data communication. The set comprises a plurality of policies wherein each policy specifies one or more access networks for one or more data flows of the data communication, and at least one policy specifies at least one further access network other than the first access network 3002 for providing one or more data flows to the UE 3001.

The response transmitter 9003 of the ANDSF 3004 is arranged to transmit an instruction to the UE 3001 to retrieve the new set of policies.

The same transmitter maybe used for transmitting the response to the PCRF 3005 and the set of policies to the UE 3001 or, in an alternative implementation, separate transmitters could be used for transmitting the response to the PCRF 3005 and the set of policies to the UE 3001.

Figure 10:
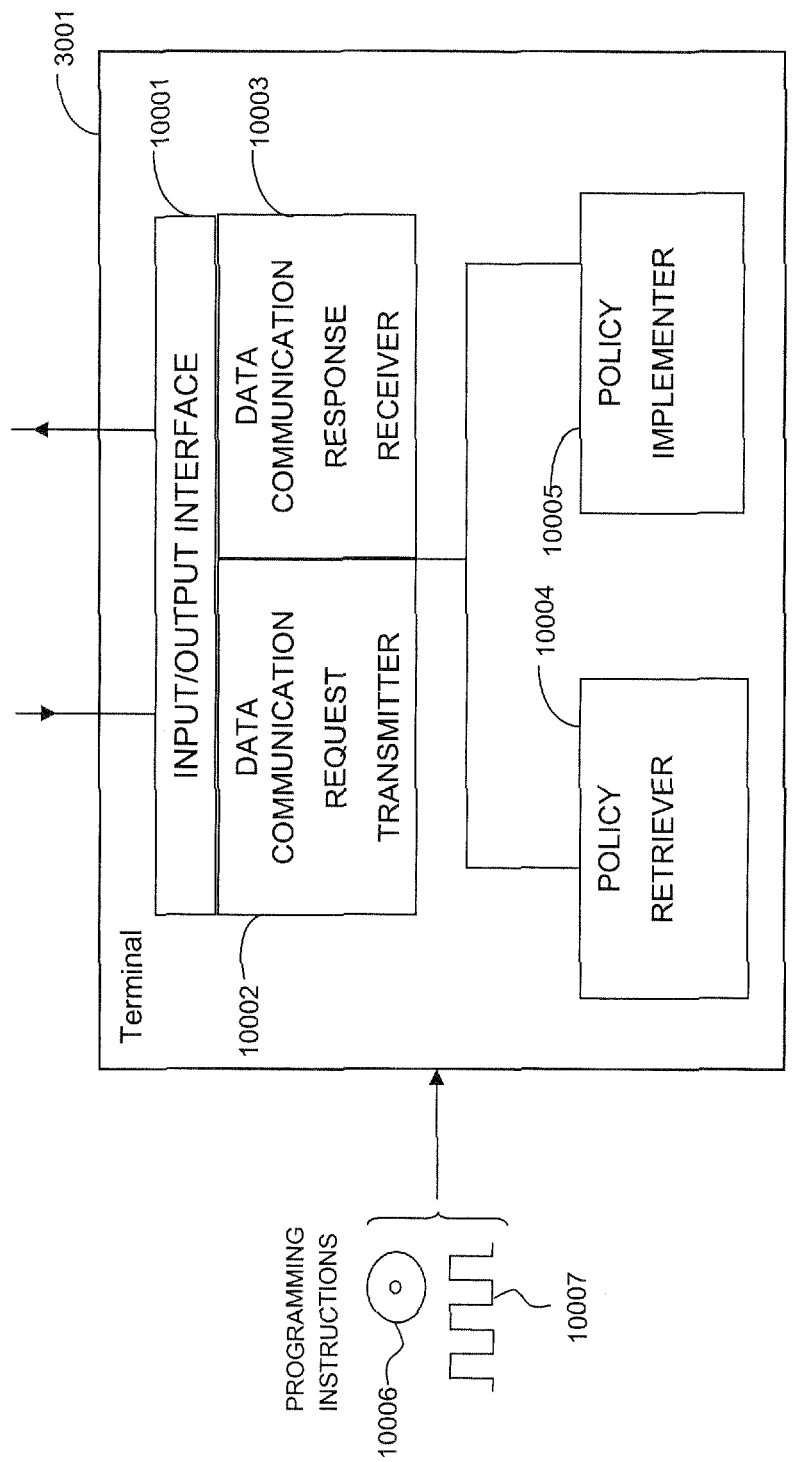
FIG. 10 shows components of a terminal according to an embodiment.

FIG. 10 shows a block diagram of a terminal 3001, or UE 3001, for use in embodiments of the invention.

Referring to FIG. 10, the terminal 3001 comprises an input/output interface 10001, a policy retriever 10004 and a policy implementer 10005, in addition to the conventional components of the UE.

In the present embodiment, the terminal 3001 comprises a programmable processing apparatus programmed to operate in accordance with programming instructions input, for example, as data stored on a data storage medium 10006 (such as an optical CD ROM, semiconductor ROM, magnetic recording medium, etc) and/or as a signal 10007 (for example an electrical or optical signal input to the programmable processing apparatus, for example from a remote database, by transmission over a communication network (not shown) such as the Internet or by transmission through the atmosphere), and/or entered by a user via a user input device such as a keyboard.

The input/output interface 10001 comprises a data communication request transmitter 10002 and a data communication response receiver 10003.

The interface components of the terminal 3001 may be provided as part of the conventional terminal interface.

Although shown as one block, the input/output interface 10001 may be provided by separate input and output interfaces.

The data communication request transmitter 10002 is arranged to transmit a request for data communication. The requested data communication is of a form that comprises a plurality of data flows.

The data communication response receiver 10003 is arranged to receive a response to the request comprising an instruction to retrieve a new set of policies for the data communication.

The data communication response receiver 10003 is further arranged to inform the policy retriever 10004 that an instruction to retrieve a new set of policies has been received.

The policy retriever 10004 is arranged to retrieve the new set of policies.

As described previously, the retrieved set of policies comprises a plurality of policies wherein each policy specifies one or more access networks for one or more data flows of the data communication, and at least one policy specifies at least one further access network other than the access network to which the terminal 3001 is currently connected for providing one or more data flows to the terminal 3001, and wherein at least one policy contains data flow information defining whether the policy applies only to a currently established data flow, a currently established data flow and a future data flow, or only to a future data flow.

The policy retriever 10004 is arranged to send the retrieved set of policies to the policy implementer 10005.

The policy implementer 10005 is arranged to implement the new set of policies for the data flows of the data communication.

Figure 11:
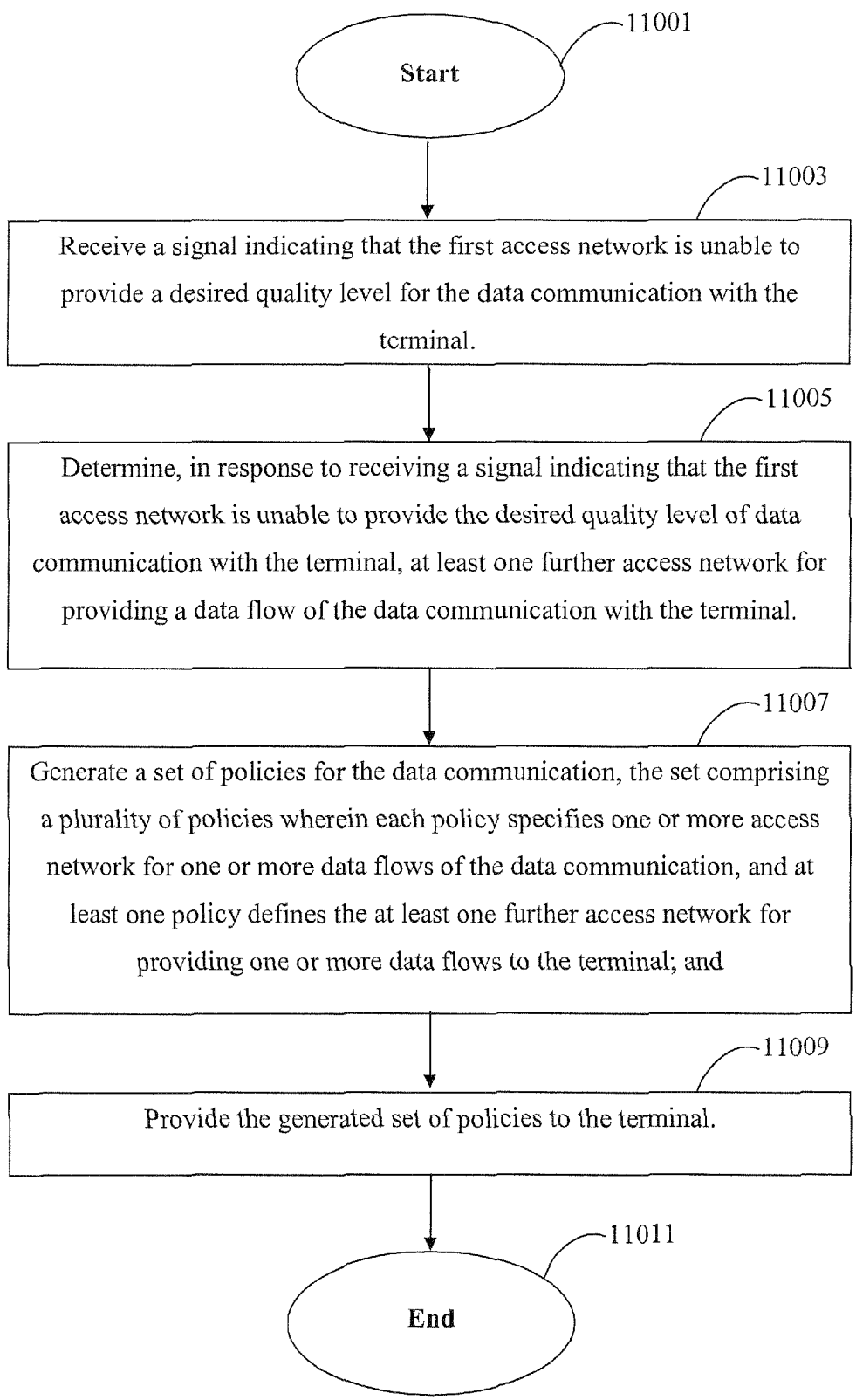
FIG. 11 shows a method of operating a network node according to an embodiment.

FIG. 11 shows a method of operating a network node, such as a PCRF 3005, according to an embodiment of the invention.

Referring to FIG. 11, at Step 11003 a signal indicating that the first access network 3002 is unable to provide a desired quality level for the data communication with a terminal is received by the network node.

At Step 11005, in response to receiving a signal indicating that the first access network 3002 is unable to provide the desired quality level of data communication with the terminal, at least one further access network is determined for providing a data flow of the data communication with the terminal.

At Step 11007, a set of policies is generated for the data communication, the set comprising a plurality of policies wherein each policy specifies one or more access networks for one or more data flows of the communication, and at least one policy defines the at least one further access network for providing one or more data flows to the terminal.

At Step 11009, the generated set of policies is provided to the terminal, either directly or via another network node.

Figure 12:
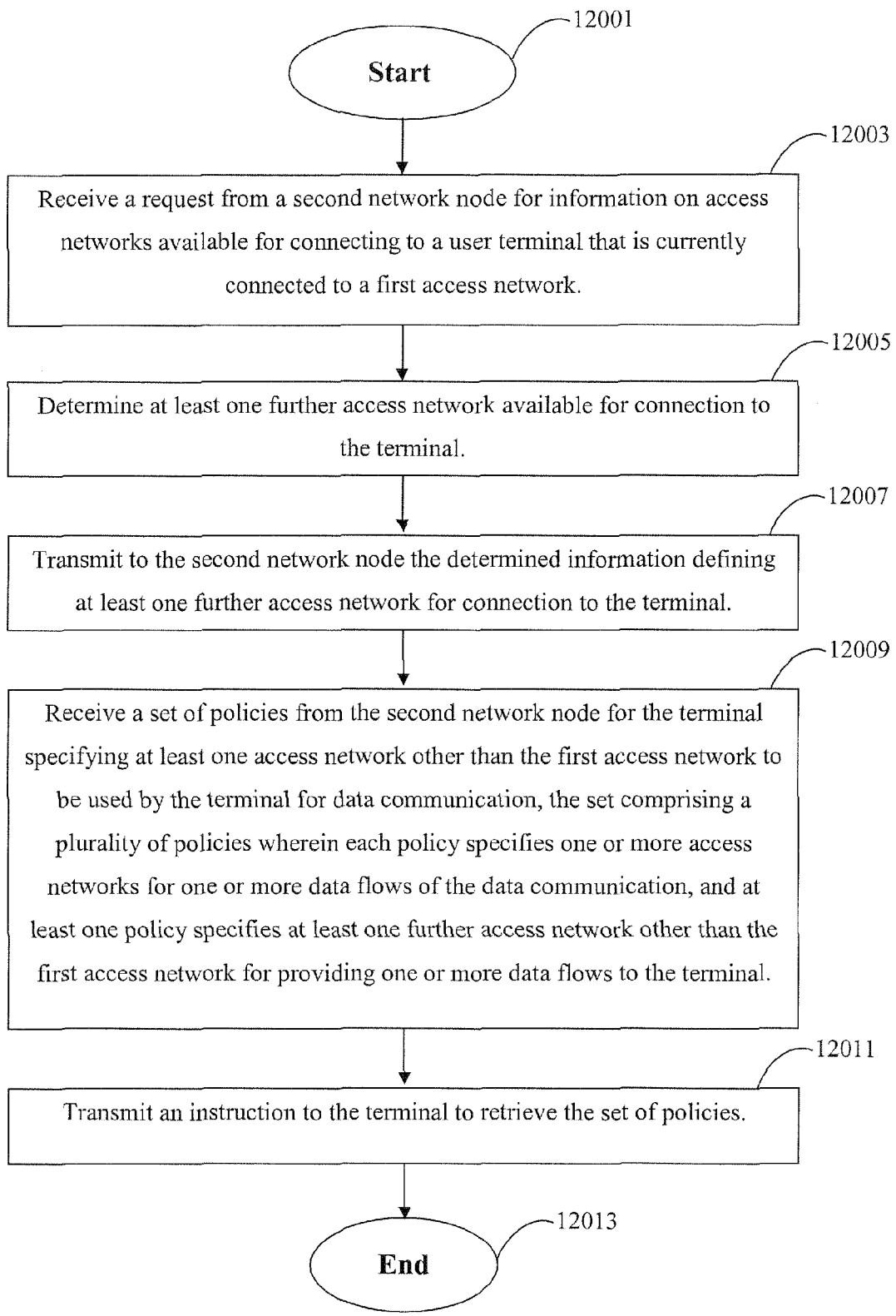
FIG. 12 shows a method of operating a network node according to an embodiment.

FIG. 12 shows a method of operating a network node, such as ANDSF 3004, according to an embodiment of the invention.

At Step 12003 a request is received from a second network node (for example a PCRF) for information on access networks available for connection to a user terminal that is currently connected to a first access network 3002.

At Step 12005, at least one further access network available for connection to the terminal is determined.

At Step 12007, the determined information defining at least one further access network for connection to the terminal is transmitted to the second network node.

At Step 12009, a set of policies is received from the second network node for the terminal specifying at least one access network other than the first access network 3002 to be used by the terminal for data communication, the set comprising a plurality of policies wherein each policy specifies one or more access networks for one or more data flows of the data communication, and at least one policy specifies at least one further access network other than the first access network 3002 for providing one or more data flows to the terminal.

At Step 12011, an instruction to the terminal to retrieve the set of policies is transmitted to the terminal.

Figure 13:
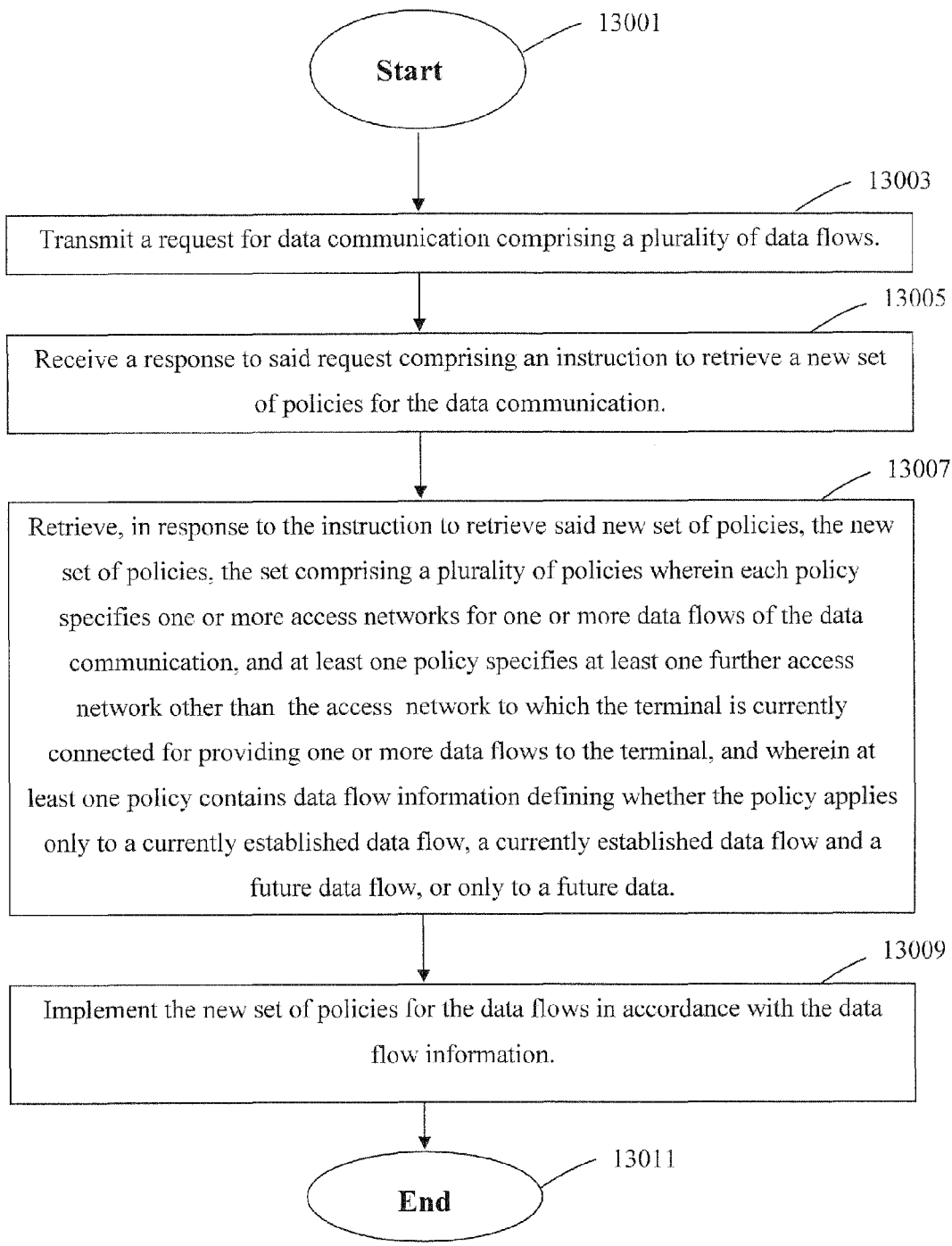
FIG. 13 shows a method of operating a terminal according to an embodiment.

FIG. 13 shows a method of operating a terminal, or UE 3001, according to an embodiment of the invention.

At Step 13003, a request for data communication comprising a plurality of data flows is transmitted.

At Step 13005, a response to the request is received, comprising an instruction to retrieve a new set of policies for the data communication.

At Step 13007, in response to the instruction to retrieve the new set of policies, the new set of policies is retrieved, the set comprising a plurality of policies wherein each policy specifies one or more access networks for one or more data flows of the data communication, and at least one policy specifies at least one further access network other than the access network to which the terminal is currently connected for providing one or more data flows to the terminal, and wherein at least one policy contains data flow information defining whether the policy applies only to a currently established data flow, a currently established data flow and a future data flow, or only to a future data flow.

At Step 13009, the new set of policies for the data flows is implemented in accordance with the data flow information.

To summarize, embodiments of the invention allow control and distribution of data flows of a data communication through the available access networks.

Advantageously, this helps to prevent the scenario of a single access network becoming overloaded while others are not utilized at their capacity. The available access networks are therefore used more efficiently and the reliability of the system to provide data communication is improved.

In one embodiment, the UE 3001 receives a message, instruction or order relating to the establishment of further services between a further access network(s) and the UE 3001 during a certain time period.

Advantageously, since the affected data flows to be switched to the further access network(s) are indicated to the UE 3001, service continuity is provided when congestion occurs in the current access network. Service signaling communication is maintained between the UE 3001 and the server providing the final service, or intervening on its provisioning.

[Modifications and Variations]

Many modification and variations can be made to the above-described embodiments.

For example, in the embodiment described above, the access network determiner and policy generator of the PCRF 3005 determine at least one further access network and generate a set of policies in response to a received signal indicating that a first access network 3002 is unable to provide the desired level of data communication with the terminal. However, in addition, the access network determiner and the policy generator may periodically perform processing to determine at least one further access network and generate the set of policies, respectively (that is, without waiting for a signal indicating that the first access network is unable to provide the desired level of data communication).

In the embodiment described above, and shown in FIG. 8, a PCRF 3005 comprises the components for detecting that a requested service cannot be provided and generating a set of policies. However, it will be understood that this above function may be performed by other types of network node.

In the embodiment described above, the policies are not provided directly from the H-PCRF 3005 to the UE 3001 and are provided via one or more other network nodes. However, it would alternatively be possible for the policies to be provided to the UE 3001 directly from the PCRF 3005.

In the embodiment described above, the ANDSF 3004 is arranged to send the policies received from the PCRF without modifying them. However, it would also be possible for the ANDSF, or any other network node, to modify the policies provided by the PCRF before the polices are passed to the UE 3001.

In the embodiment described above, an H-PCRF 3005 and H-ANDSF 3004 are provided in a Home network. It will be understood that the embodiment could alternatively have described a V-PCRF 3005 and V-ANDSF 3004 in a Visited network, or a PCRF 3005 and ANDSF 3004 in any other type of network.

In the embodiments described above with reference to FIGS. 8, 9 and 10, the PCRF, ANDSF and UE comprise programmable computer processing apparatus and perform processing operations defined by computer program instructions. However, some, or all, of the processing operations could be performed using hardware instead.

The foregoing description of embodiments has been presented for the purpose of illustration and description. It is not intended to be exhaustive or to limit the invention to the precise form disclosed. In light of the foregoing description, it will be evident to a person skilled in the art that many alterations, modifications and variations can be made.

The invention claimed is:

1. A communications network node configured to determine a set of policies for a terminal that is connected to a first access network so as to provide a desired quality level of data communication with the terminal using a plurality of data flows, the network node comprising:
   a failure indication receiver configured to receive a signal indicating that the first access network is unable to provide a desired quality level for the data communication with the terminal;
   an access network determiner configured, in response to the failure indication receiver receiving a signal indicating that the first access network is unable to provide the desired quality level of data communication with the terminal, to determine at least one further access network suitable for providing a data flow of the data communication with the terminal;
   a policy generator configured to generate a set of policies for the data communication, the set comprising a plurality of policies wherein each policy specifies one or more access networks for one or more data flows of the data communication, and at least one policy specifies the at least one further access network determined by the access network determiner for providing one or more data flows to the terminal, wherein:
   the policy generator is configured to generate at the least one policy in the set such that the policy includes data flow information defining whether the policy applies only to a currently established data flow, a currently established data flow and a future data flow, or only to a future data flow, and
   the policy generator is configured to include the data flow information in the at least one policy by providing a flag therefor in an Access Network Discovery and Selection Function, ANDSF, Management Object; and
   a policy provider configured to provide the generated set of policies to the terminal.

2. A network node according to claim 1, further comprising:
   a request transmitter configured to transmit a request to a second network node, wherein the request is for information on access networks available for connection to the terminal; and
   an information response receiver configured to receive a response from the second network node comprising information on one or more access networks available for connection to the terminal;
   and wherein:
   the access network determiner is configured to determine the at least one further access network for providing a data flow of the data communication with the terminal in dependence upon the information received from the second network node on the one or more access networks available for connection to the terminal.

3. A network node according to claim 2, wherein the second network node comprises an Access Network Discovery and Selection Function, ANDSF.

4. A network node according to claim 1, wherein the access network determiner is configured to determine the at least one further access network for providing a data flow of the data communication with the terminal in dependence upon information defining network access capabilities of the terminal.

5. A network node according to claim 1, wherein the access network determiner is configured to verify the ability of the at least one further access network to provide a data flow to the terminal prior to determining the at least one further access network as being suitable for providing a data flow of the data communication with the terminal.

6. A network node according to claim 1, wherein:
the access network determiner is configured to determine a prioritized list of further access networks for providing a data flow to the terminal; and
the policy generator is configured to generate at least one policy such that it comprises the prioritized list.

7. A network node according to claim 1, wherein the policy generator is configured to generate a set of policies comprising a policy specifying the first access network for providing at least one data flow to the terminal and at least one other policy specifying one or more further access networks for providing at least one further data flow to the terminal, each of the further data flows being different to the data flow(s) provided by the first access network.

8. A network node according to claim 1, wherein the policy generator is configured to generate at least one policy in the set such that the policy includes information defining a time of applicability for the policy.

9. A network node according to claim 1, wherein:
the access network determiner and the policy generator are arranged to determine the at least one further access network and generate the set of policies, respectively, periodically in addition to determining the at least one further access network and generating the set of policies in response to the receiver receiving a signal indicating that the first access network is unable to provide the desired level of data communication with the terminal.

10. A network node according to claim 1, wherein the network node is configured to generate a set of policies for data communication using data flows comprising signalling, audio data and video data.

11. A network node according to claim 1, wherein the network node is configured to determine a set of policies for data communication comprising IP communication.

12. A network node according to claim 1, wherein the network node is a mobile communications network node configured to determine a set of policies for a terminal that is a mobile terminal.

13. A network node according to claim 1, wherein the network node is a Policy and Charging Rules Function, PCRF.

14. A network node according to claim 13, wherein the policy provider is configured to provide the generated set of policies to the terminal by transmitting the generated set of policies to a network node comprising an Access Network Discovery and Selection Function, ANDSF, for provision thereby to the terminal.

15. A method of determining in a communications network node a set of policies for a terminal that is connected to a first access network so as to provide a desired quality level of data communication with the terminal using a plurality of data flows, the method comprising:
receiving a signal indicating that the first access network is unable to provide a desired quality level for the data communication with the terminal;
determining, in response to receiving a signal indicating that the first access network is unable to provide the desired quality level of data communication with the terminal, at least one further access network suitable for providing a data flow of the data communication with the terminal;
generating a set of policies for the data communication, the set comprising a plurality of policies wherein each policy specifies one or more access networks for one or more data flows of the data communication, and at least one policy specifies the at least one further access network for providing one or more data flows to the terminal, wherein:
the process of generating the set of policies generates at least one policy in the set such that the policy includes data flow information defining whether the policy applies only to a currently established data flow, a currently established data flow and a future data flow, or only to a future data flow, and
the process of generating the set of policies includes the data flow information in the at least one policy by providing a flag therefor in an Access Network Discovery and Selection Function, ANDSF, Management Object; and
providing the generated set of policies to the terminal.

16. A method according to claim 15, further comprising:
transmitting a request to a second network node, wherein the request is for information on access networks available for connection to the terminal; and
receiving a response from the second network node comprising information on one or more access networks available for connection to the terminal;
and wherein the process of determining at least one further access network determines the at least one further access network for providing a data flow of the data communication with the terminal in dependence upon the information received from the second network node on the one or more access networks available for connection to the terminal.

17. A method according to claim 15, wherein the process of determining at least one further access network determines the at least one further access network for providing a data flow of the data communication with the terminal in dependence upon information defining network access capabilities of the terminal.

18. A method according to claim 16, wherein the second network node comprises an Access Network Discovery and Selection Function, ANDSF.

19. A method according to claim 15, wherein the process of determining at least one further access network verifies the ability of the at least one further access network to provide a data flow to the terminal prior to determining the at least one further access network as being suitable for providing a data flow of the data communication with the terminal.

20. A method according to claim 15, wherein the process of determining at least one further access network determines a prioritized list of further access networks for providing a data flow to the terminal; and
the process of generating a set of policies generates at least one policy such that it comprises the prioritized list.

21. A method according to claim 15, wherein the process of generating a set of policies generates a set of policies comprising a policy specifying the first access network for providing at least one data flow to the terminal and at least one other policy specifying one or more further access networks for providing at least one further data flow to the terminal, each of the further data flows being different to the data flow(s) provided by the first access network.

22. A method according to claim 15, wherein the process of generating a set of policies generates at least one policy in the set such that the policy includes information defining a time of applicability for the policy.

23. A method according to claim 15, wherein the process of determining at least one further access network and the process of generating a set of policies determine the at least one further access network and generate the set of policies, respectively, periodically in addition to determining the at least one further access network and generating the set of policies in response to receiving a signal indicating that the first access network is unable to provide the desired level of data communication with the terminal.

24. A method according to claim 15, wherein the method generates a set of policies for data communication using data flows comprising signaling, audio data and video data.

25. A method according to claim 15, wherein the method determines a set of policies for data communication comprising IP communication.

26. A method according to claim 15, wherein the network node is a mobile communications network node configured to determine a set of policies for a terminal that is a mobile terminal.

27. A method according to claim 15, wherein the method is implemented by a Policy and Charging Rules Function, PCRF.

28. A method according to claim 27, wherein the process of providing the generated set of policies provides the generated set of policies to the terminal by transmitting the generated set of policies to a network node comprising an Access Network Discovery and Selection Function, ANDSF, for provision thereby to the terminal.

29. A non-transitory computer-readable storage medium storing computer program instructions which, when executed by a processor, cause the processor to—:

receive a signal indicating that the first access network is unable to provide a desired quality level for the data communication with the terminal;

determine, in response to receiving a signal indicating that the first access network is unable to provide the desired quality level of data communication with the terminal, at least one further access network suitable for providing a data flow of the data communication with the terminal;

generate a set of policies for the data communication, the set comprising a plurality of policies wherein each policy specifies one or more access networks for one or more data flows of the data communication, and at least one policy specifies the at least one further access network for providing one or more data flows to the terminal, wherein:

generating the set of policies generates at least one policy in the set such that the policy includes data flow information defining whether the policy applies only to a currently established data flow, a currently established data flow and a future data flow, or only to a future data flow, and generating the set of policies includes the data flow information in the at least one policy by providing a flag therefor in an Access Network Discovery and Selection Function, ANDSF, Management Object; and provide the generated set of policies to the terminal.

* * * * *